(No Model.)  G. E. POOLE.  2 Sheets—Sheet 1.
MEANS FOR CONNECTING PIPES TO BOWLS.
No. 301,268.  Patented July 1, 1884.
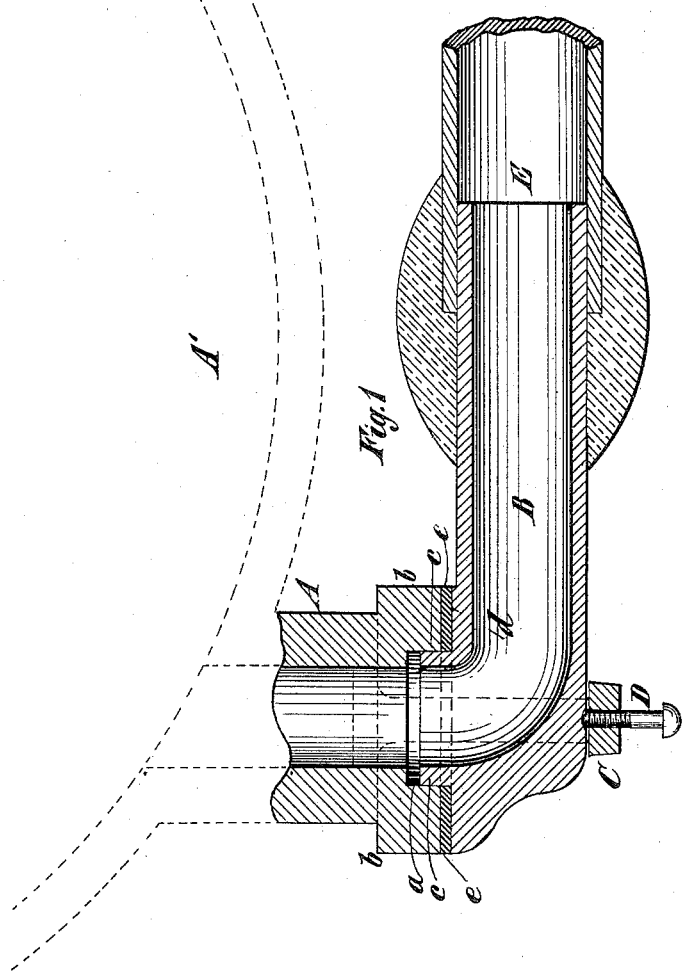
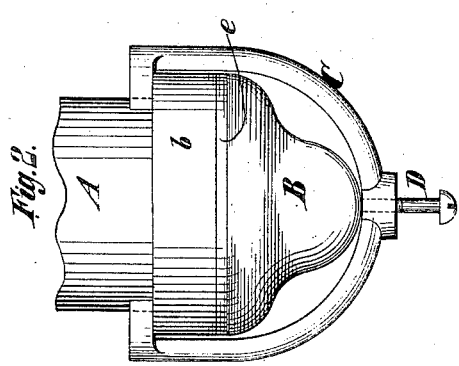
Witnesses
James R. Bowen
T. J. Keane
Inventor
George E. Poole,
by his attorney,
Edwin H. Brown.

(No Model.) 2 Sheets—Sheet 2.
G. E. POOLE.
MEANS FOR CONNECTING PIPES TO BOWLS.
No. 301,268. Patented July 1, 1884.
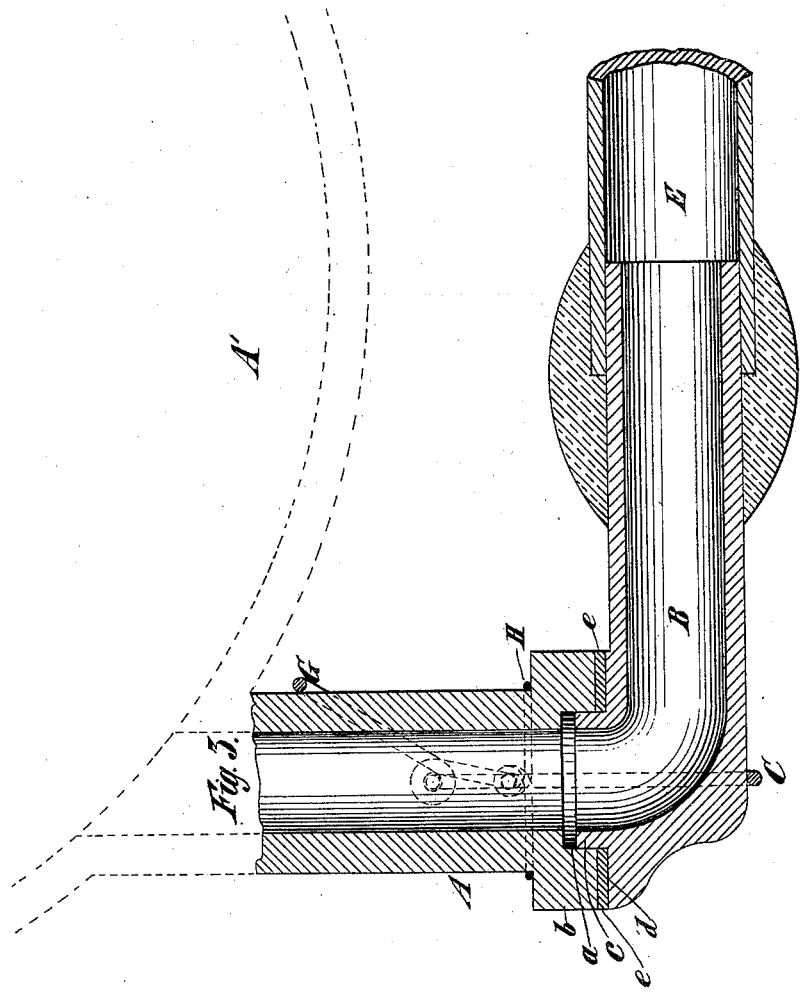
Witnesses
James R. Bowen.
T. J. Keane
Inventor
George E. Poole,
by his attorney,
Edwin H. Brown.

UNITED STATES PATENT OFFICE.

GEORGE E. POOLE, OF NEW YORK, N. Y., ASSIGNOR TO CHARLES HARRISON, OF SAME PLACE.

MEANS FOR CONNECTING PIPES TO BOWLS.

SPECIFICATION forming part of Letters Patent No. 301,268, dated July 1, 1884.

Application filed November 28, 1883. (No model.)

*To all whom it may concern:*

Be it known that I, GEORGE E. POOLE, of New York, in the county of New York and State of New York, have invented a new and useful Improvement in Means for Connecting Pipes to Bowls, of which the following is a specification.

The object of this improvement is principally to provide a simple and convenient means for connecting metal water-supply pipes to water-closet bowls.

The improvement consists in the combination, with a nozzle extending from a water-closet bowl, and having an internal rabbet and an outwardly-extending flange, of a pipe-elbow provided with a rim to fit the rabbet, and a strap embracing the pipe-elbow engaging with the flange of the pipe-elbow, and provided with means whereby it may be made to secure the pipe-elbow to the nozzle.

In the accompanying drawings, Figure 1 is a longitudinal section of the nozzle of a water-closet bowl, a pipe-elbow, a portion of pipe secured to the latter, and a sectional view of means whereby a tight joint will be formed between the pipe-elbow and nozzle. Fig. 2 is an end view of the pipe-elbow, and a side view of the nozzle and the means whereby the joint between the pipe-elbow and nozzle are formed. Fig. 3 is a longitudinal section of the nozzle of a water-closet bowl, a pipe-elbow, a portion of the pipe, and a sectional view of a different means for securing the pipe-elbow to the nozzle; and Fig. 4 is an end view of these parts.

Similar letters of reference designate corresponding parts in all the figures.

A designates the nozzle of a water-closet bowl, A', a portion of which I have shown in dotted lines, and which is made, as usual, of earthenware or iron. At the outer end it is provided internally with a rabbet, *a*, and an outwardly-projecting flange, *b*.

B designates a pipe-elbow, that will preferably be cast of brass or iron. Its interior passage bends around so as to be in a position at about right angles to the length of the pipe-section. From this end extends an annular rim, *c*, of such size that it will fit snugly in the rabbet *a* of the nozzle A, and at the base or inner end of this rim is a surface, *d*, corresponding to the adjacent face of the flange *b*, and adapted to fit close to the same. Around the rim *c*, and between the surface *d* and the adjacent face of the flange *b*, is a packing-ring, *e*, of india-rubber or other suitable material.

In Figs. 1 and 2, C designates a strap, made of brass, malleable iron, or other metal, adapted to extend around the pipe-elbow B, and having its ends turned inward, so that they may overlap the back of the flange *b*. Preferably the opposite faces of the ends of the strap C are recessed, so as the better to fit around the nozzle, and when so made the strap will have its ends sprung apart when applied to or removed from the nozzle. The strap will be slipped into and out of place edgewise. At the central portion the strap is provided with a tapped hole, in which is fitted a screw, D. By turning this screw so that its end will impinge against the pipe-elbow, the latter may be forced toward the nozzle, so that a tight joint will be formed between the parts. Obviously I may use in lieu of the screw any analogous device.

In Figs. 3 and 4, C is a strap made of metal, adapted to extend around the pipe-elbow, and pivoted at the ends to a lever, G. This lever is pivoted at the ends to a wire, H, which is fastened around the nozzle A close to the flange *b* thereof, and is looped to provide bearings *g* for the ends of the strap C. By slipping the strap over the pipe-elbow and then adjusting the lever G, the pipe-elbow may be secured to the nozzle, and by adjusting the lever reversely the strap will be released, so that it can be swung away from the pipe-elbow to admit of the detachment of the latter.

It will be seen that by my improvement I produce by very simple means an extremely effective joint.

Lead pipe E may be slipped over the outer end of the pipe-elbow in either example of my improvement, and secured thereto by a plumber's ordinary wipe-joint. The lead pipe may be thus connected to the pipe-elbow before the pipe-elbow is fastened to the nozzle, and the lead pipe may be bent so that the pipe-nozzle may be applied in any position to the nozzle. My improvement will be found very advantageous on this account.

I do not wish to be confined to a strap of the kinds described, as others may be used in lieu thereof.

What I claim as my invention, and desire to secure by Letters Patent, is—

1. The combination of a nozzle of a water-closet bowl, having on its outer end an outwardly-extending flange and an internal rabbet, a pipe-elbow having a rim adapted to fit the rabbet, the internal passage of said elbow being of approximately the same diameter as the passage in the nozzle, the two forming one continuous and unobstructed passage, a strap embracing the pipe-elbow, and means whereby it may be made to secure the pipe-elbow in the nozzle.

2. The combination of a nozzle, A, of a water-closet bowl, having the rabbet $a$ and flange $b$, a pipe-elbow, B, provided with the rim $c$ and the strap C, and screw D, substantially as specified.

GEORGE E. POOLE.

Witnesses:
T. J. KEANE,
JAMES R. BOWEN.